United States Patent
Qian et al.

(10) Patent No.: US 12,243,045 B2
(45) Date of Patent: Mar. 4, 2025

(54) SYSTEMS AND METHODS FOR CARD AUTHENTICATION

(71) Applicant: Capital One Services, LLC, McLean, VA (US)

(72) Inventors: Elizabeth Qian, Long Island, NY (US); Robert Fenster, Reston, VA (US); David Huang, Henrico, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/318,227

(22) Filed: May 16, 2023

(65) Prior Publication Data

US 2024/0386414 A1    Nov. 21, 2024

(51) Int. Cl.
 *G06Q 20/34* (2012.01)
 *G06V 40/16* (2022.01)
 *G10L 17/00* (2013.01)

(52) U.S. Cl.
 CPC ......... *G06Q 20/354* (2013.01); *G06V 40/172* (2022.01); *G10L 17/00* (2013.01)

(58) Field of Classification Search
 None
 See application file for complete search history.

(56) References Cited

U.S. PATENT DOCUMENTS

| | | | |
|---|---|---|---|
| 8,127,982 B1 | 3/2012 | Casey et al. | |
| 9,665,901 B2 | 5/2017 | Balram et al. | |
| 10,685,347 B1 * | 6/2020 | Edwards | G06F 21/36 |
| 2015/0028996 A1 | 1/2015 | Agrafioti et al. | |
| 2015/0149354 A1 | 5/2015 | McCoy | |
| 2016/0283737 A1 | 9/2016 | Soman et al. | |
| 2017/0004482 A1 | 1/2017 | Mancini | |
| 2019/0259374 A1 * | 8/2019 | Kwon | H04N 21/43615 |
| 2022/0116770 A1 * | 4/2022 | Li | H04L 63/0861 |
| 2022/0198453 A1 * | 6/2022 | Kruse | H04L 9/14 |
| 2022/0335395 A1 * | 10/2022 | Srinivasarangan | G06V 30/416 |
| 2024/0185246 A1 * | 6/2024 | Nishimura | G06Q 20/1085 |

OTHER PUBLICATIONS

"Lawrence O'Gorman, Comparing Passwords, Tokens, and Biometrics for User Authentication, IEEE, 2003" (Year: 2003).*

* cited by examiner

*Primary Examiner* — Christopher Bridges
*Assistant Examiner* — Toan Duc Bui
(74) *Attorney, Agent, or Firm* — TROUTMAN PEPPER LOCKE LLP; Christopher J. Forstner; John A. Morrissett

(57) ABSTRACT

Disclosed embodiments may include a system for card authentication. The system may receive, via a user device, a voice request to activate a card associated with a customer account. The system may generate, using a first machine learning model (MLM), a voice fingerprint confidence score based on comparing a first voice in the voice request to a second voice in a stored audio file associated with a customer of the customer account. The system may generate, using a second MLM, a device authentication score based on comparing an address from the user device to a stored address of a known user device associated with the customer account. The system may determine whether the voice request is valid based at least in part on the voice fingerprint confidence score and the device authentication score. The system may activate the card based on the determination that the voice request is valid.

19 Claims, 3 Drawing Sheets

SYSTEMS AND METHODS FOR CARD AUTHENTICATION

FIELD

The disclosed technology relates to systems and methods for card authentication. Specifically, this disclosed technology relates to activating a card based on determining the validity of a received voice request.

BACKGROUND

Traditional systems and methods for card authentication typically involve limited options for activating a new card, such as calling a specified phone number (e.g., a customer service line), or tapping the card on a mobile device. These traditional systems and methods typically require users perform a multi-step authentication process, such as two-factor authentication, and/or disclose a variety of personal information, such as a social security number, date of birth, account number, and the like.

Accordingly, there is a need for improved systems and methods for card authentication. Embodiments of the present disclosure may be directed to this and other considerations.

SUMMARY

Disclosed embodiments may include a system for card authentication. The system may include one or more processors, and a memory in communication with the one or more processors and storing instructions that, when executed by the one or more processors, are configured to cause the system to conduct card authentication. The system may receive, via a user device, an audio file comprising a first voice of a customer. The system may associate the audio file with a first customer account of the customer. The system may store the audio file. The system may receive, via the user device, a first credential token and a voice request to activate a card associated with a second customer account. The system may generate, using a first machine learning model (MLM), a voice fingerprint confidence score based on comparing a second voice in the voice request to the first voice of the stored audio file. The system may generate, using a second MLM, a device authentication score based on comparing an address from the user device to a stored address of a known user device associated with the second customer account. The system may determine whether the first credential token is valid by comparing the first credential token to a second credential token associated with the user device. The system may determine whether the voice request is valid based at least in part on the voice fingerprint confidence score, the device authentication score, and the determination of whether the first credential token is valid. The system may activate the card based on the determination that the voice request is valid.

Disclosed embodiments may include a system for card authentication. The system may include one or more processors, and a memory in communication with the one or more processors and storing instructions that, when executed by the one or more processors, are configured to cause the system to conduct card authentication. The system may receive, via a user device, a voice request to activate a card associated with a customer account. The system may generate, using a first MLM, a voice fingerprint confidence score based on comparing a first voice in the voice request to a second voice in a stored audio file associated with a customer of the customer account. The system may generate, using a second MLM, a device authentication score based on comparing an address from the user device to a stored address of a known user device associated with the customer account. The system may determine whether the voice request is valid based at least in part on the voice fingerprint confidence score and the device authentication score. The system may activate the card based on the determination that the voice request is valid.

Disclosed embodiments may include a system for card authentication. The system may include one or more processors, and a memory in communication with the one or more processors and storing instructions that, when executed by the one or more processors, are configured to cause the system to conduct card authentication. The system may receive a request for a first credential token associated with a user device. The system may generate the first credential token. The system may store the first credential token. The system may receive, via the user device, a second credential token and a voice request to activate a card associated with a customer account. The system may generate, using a first MLM, a voice fingerprint confidence score based on comparing a voice in the voice request to a stored voice associated with the customer account. The system may determine whether the second credential token is valid by comparing the first credential token to the second credential token. The system may determine whether the voice request is valid based at least in part on the voice fingerprint confidence score and the determination of whether the second credential token is valid. The system may activate the card based on the determination that the voice request is valid.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
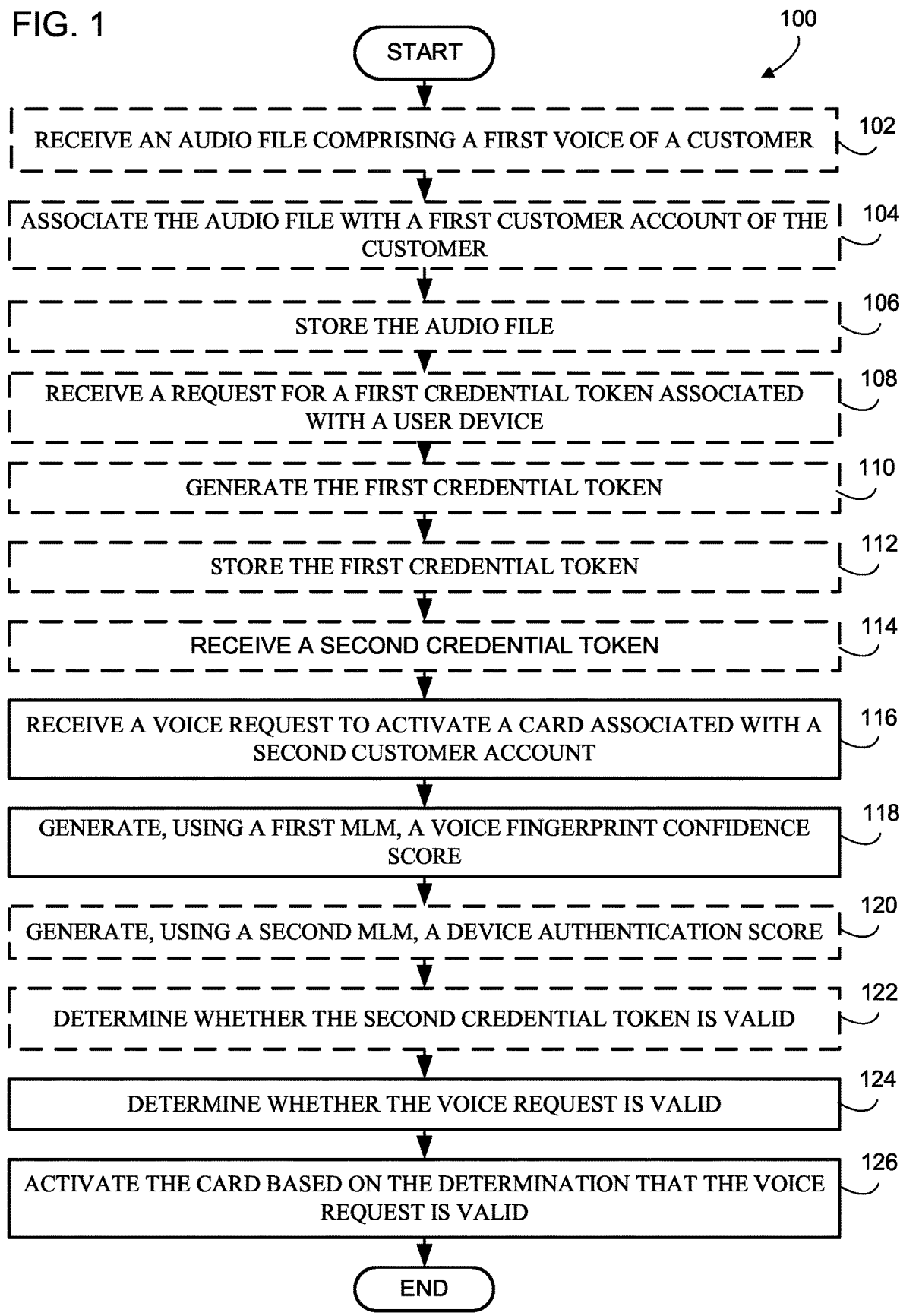
FIG. 1 is a flow diagram illustrating an exemplary method for conducting card authentication, in accordance with certain embodiments of the disclosed technology.

Traditional systems and methods for card authentication typically involve limited options for activating a new card, such as calling a specified phone number (e.g., a customer service line), or tapping the card on a mobile device. These traditional systems and methods typically require users perform a multi-step authentication process, such as two-factor authentication, and/or disclose a variety of personal information, such as a social security number, date of birth, account number, and the like. Some users may find these traditional systems and methods challenging to use, particularly users that may experience some type of physical impediment (e.g., tremors).

Accordingly, examples of the present disclosure may provide for receiving a voice request from a user to activate a card; utilizing one or more machine learning models (MLMs) to generate one or more fingerprints and/or confidence scores associated with, for example, the user's voice and/or utilized device; and determining whether the voice request is valid based on the generated fingerprints and/or confidence scores.

Disclosed embodiments may employ MLMs, among other computerized techniques, generate fingerprints and/or confidence scores to aid in determining the validity of a card activation voice request. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to compare voice samples, device identification information, credential tokens, and/or stored card numbers to generate respective authentication fingerprints and/or confidence scores. This, in some examples, may involve using user- and/or device-specific input data and an MLM, applied to determine similarities between the input data and stored or known features. Using an MLM and a computer system configured in this way may allow the system to provide a determination as to the validity of a card activation voice request.

This may provide an advantage and improvement over prior technologies that may not be configured to automatically authenticate a card based on model determinations. The present disclosure solves this problem by training models to evaluate user- and device-specific features to arrive at a predicted validity of a voice request. Furthermore, examples of the present disclosure may also improve the speed with which computers can conduct card authentication. Overall, the systems and methods disclosed have significant practical applications in the card authentication and activation fields because of the noteworthy improvements of automated fingerprint evaluation, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for conducting card authentication, in accordance with certain embodiments of the disclosed technology. The steps of method 100 may be performed by one or more components of the system 300 (e.g., comparison system 220, web server 310 of card authentication system 308, and/or user device 302), as described in more detail with respect to FIGS. 2 and 3. While certain blocks may be identified as being optional, certain embodiments may omit blocks even if they are not necessarily identified as being optional.

In optional block 102, the comparison system 220 may receive, via a user device (e.g., user device 302), an audio file comprising a first voice of a customer. In some embodiments, the audio file may be one that a customer submits as part of the customer's profile or account information. In some embodiments, the system may be configured to automatically capture and record an audio file when the system recognizes the customer is the individual speaking, such that the system may later utilize the captured audio in comparing to future received voice requests, as further discussed below.

In optional block 104, the comparison system 220 may associate the audio file with a first customer account of the customer. In some embodiments, associating the audio file with the first customer account may include labeling or tagging the audio file and/or assigning the audio file to the first customer account, such as in a customer profile.

In optional block 106, the comparison system 220 may store the audio file. In some embodiments, the system may store the audio file in a backend database (e.g., database 316), and/or in a storage location specifically associated with the first customer account of the customer, such as in a database associated with a customer profile.

In optional block 108, the comparison system 220 may receive a request for a first credential token associated with a user device (e.g., user device 302). In some embodiments, the first credential token may include unique identification information associated with a user device, such as a smart speaker owned by the customer. For example, the first credential token may include a password, a passcode, a personal identification number (PIN), and the like. The system may receive the request from the customer via, for example, the user device, such as by the customer speaking into the user device, or via a secondary device associated with the customer, such as a mobile device with which the customer may log into a profile or account and submit a request for the system to generate a new credential token to be associated with the user device.

In optional block 110, the comparison system 220 may generate the first credential token. In some embodiments, responsive to receiving the customer's request, the system may generate the first credential token as a unique way of identifying the user device.

In optional block 112, the comparison system 220 may store the first credential token. In some embodiments, as described above in block 106 with respect to the audio file, the system may store the first credential token in a backend database (e.g., database 316), and/or in a storage location specifically associated with the first customer account of the customer, such as in a database associated with a customer profile.

In optional block 114, the comparison system 220 may receive a second credential token. In some embodiments, the system may receive the second credential token as a spoken utterance from the customer via the user device, and/or as an input of a user input object (e.g., a text box, a drop-down menu, etc.) within a graphical user interface (GUI) of a secondary device (e.g., a mobile device) associated with the customer.

In block 116, the comparison system 220 may receive, via the user device, a voice request to activate a card associated with a second customer account. In some embodiments, the card may be a new transaction, payment, and/or rewards card. The system may receive the voice request, such as a spoken utterance via the user device (e.g., a smart speaker). In some embodiments, the second customer account may be the same as or different from the first customer account as discussed above with respect to block 104. In some embodiments, the voice request may include the last four digits of the new card number to aid in prompting the system to recognize the request as a request to activate the new card and/or to initiate or trigger an activation process via one or more MLMs, as further discussed below.

In block 118, the comparison system 220 may generate, using a first MLM, a voice fingerprint confidence score based on comparing a voice in the voice request to the first voice of the stored audio file. In some embodiments, the first MLM may be trained to evaluate certain features of the voice samples, such as pitch, tone, cadence, rate, volume, pace, pause, fluency, intensity, articulation, enunciation, etc. In some embodiments, the first MLM may rank the similarity between the voice in the voice request to the stored voice sample on a scale, for example, of 0-10. In some embodiments, the voice fingerprint confidence score may be based on or equivalent to the ranking. The system may have pre-implemented or pre-programmed a threshold ranking (e.g., 6 on the 0-10 scale) above which the system trusts the voice in the voice request to be similar enough to the stored voice sample that the voice can be authenticated.

In optional block 120, the comparison system 220 may generate, using a second MLM, a device authentication score. In some embodiments, the device authentication score may be based on comparing an address from the user device to a stored address of a known user device associated with the second customer account. For example, the customer may have previously registered the user device with the system (e.g., an organization that owns and/or operates card authentication system 308), for example, based on its internet protocol (IP) address, media access control (MAC) address, etc. The customer may have previously registered the user device with the system by, for example, inputting one or more of the above-mentioned types of device-specific information into a GUI of a web or mobile application of a secondary device (e.g., a mobile device) associated with the customer.

In some embodiments, similar to with the voice fingerprint confidence score (block 118), the second MLM may be trained to rank a similarity between the address from the user device and the stored address of the known user device. To evaluate this similarity, particularly in situations where the second MLM does not identify an exact match, the second MLM may be trained to predict a likelihood that the user device and known user device are associated with the same customer or customer account, and/or are housed in a similar location. For example, the stored address may be an IP address of a secondary device associated with the customer. The system may identify a different IP address of the user device; however, the second MLM may be trained to recognize that as both IP addresses are connected to the same personal home network, there is an increased likelihood that both the user device and the known user device are associated with the customer and/or second customer account. In some embodiments, the system may have pre-implemented or pre-programmed a threshold ranking (e.g., 6 on the 0-10 scale) above which the system trusts the user device to be similar enough to the known user device that the user device can be authenticated.

In some embodiments, generating the device authentication score may be based on determining whether a location of the user device is within a predetermined distance of a known location of a second customer associated with the second customer account. For example, the system may be configured to receive location data (e.g., geolocation data) associated with the user device. The system may utilize this location data to determine whether the user device, e.g., by which the customer transmitted the voice request, is within a predetermined distance (e.g., measured in feet, yards, etc.) of a known location of a second customer associated with the second customer account. The known location may be, for example, a home or business address previously provided by the second customer to the system. The second customer may be the same customer who transmitted the voice request (block 116), or a different customer, yet one still associated with the second customer account (e.g., an authorized or secondary user).

In optional block 122, the comparison system 220 may determine whether the second credential token is valid. In some embodiments, the system may compare the second credential token to the first credential token, as discussed above with respect to block 110, to determine a similarity or match between the two credential tokens. In some embodiments, the system may make such determination based on the age of the first credential token. For example, the system may require the stored first credential token be less than a certain age (e.g., 30 days) to compare it to the received second credential token. In some embodiments, the system may rank the potential validity of the second credential token based on an age range. For example, using a scale of 0-5, the system may determine the second credential is not valid (e.g., a rank of 0) if the first credential is older than 60 days, the second credential is slightly more valid (e.g., a rank of 1) if the first credential is between 45-60 days old, the second credential is likely valid (e.g., a rank of 5) if the first credential is less than 7 days old, etc.

In block 124, the comparison system 220 may determine whether the voice request is valid. In some embodiments, the validity determination may be based on one or more of the above-described factors, e.g., the voice fingerprint confidence score, device authentication score, and/or the determination of whether the second credential token is valid, and/or one or more of the additional factors as further discussed below. In some embodiments, the system may have a predetermined ranking in place as to the respective weight of each of these factors in the overall voice request validity determination. For example, if a customer has been with an organization (e.g., that owns and/or operates card authentication system 308) for a certain period of time, and/or has a certain number of accounts with the organization, the organization may weigh certain factors above others. In some embodiments, the system may be programmed to only validate a voice request if a certain number of required factors are determined to exceed their respective thresholds, as discussed above.

In some embodiments, the voice request may include a card number associated with the card. In such instances, the system may be configured to generate, using a third MLM, a card number score (e.g., on a scale from 0-10) by comparing the card number to a second card number previously associated with the customer. For example, responsive to receiving the voice request, the system may retrieve a second card number that was previously assigned to (e.g., in the customer's account) and/or communicated with (e.g., emailed, mailed, etc.) the customer. The system may compare this retrieved second card number to the card number in the voice request to ensure a match between the two numbers. In some embodiments, where a complete match is not found, the third MLM may be trained to identify patterns or sequences between the card number and the second card number, that may indicate a likelihood that the card number is also associated with the customer. For example, the system may assign a new card number to a customer based on numbers previously assigned to the same customer, such as using the same first four, eight, or twelve digits. In some embodiments, determining whether the voice request is valid, as discussed above, is further based on the card number score.

In some embodiments, the comparison system 220 may receive image data via the user device. For example, the user device may include an image capturing device (e.g., a camera) that may be configured to take a photo of the customer, for example, upon receiving an input from the customer to do so (e.g., a vocal command), and/or at the same time the customer transmits the voice request. In some embodiments, the system may extract an image of the speaker of the voice request from the image data, and may determine whether the extracted image matches a stored image of a second customer associated with the second customer account. In some embodiments, the system may utilize image processing techniques (e.g., facial recognition technology) to determine a likelihood (e.g., on a scale of 0-10) that the extracted image matches the stored image. In some embodiments, the second customer may be the same customer who transmitted the voice request (block 116), or a different customer, yet one still associated with the second customer account (e.g., an authorized or secondary user).

In some embodiments, the comparison system 220 may determine, for example, based on the above-described factors and/or respective weights, that the voice request is not valid. In such instances, the system may transmit an audio file to the customer, e.g., via the user device. The audio file may include a request that the customer submit a new voice request and/or that the customer be contacted via a stored phone number (e.g., the customer's mobile phone number) such that the customer may complete the card activation process. For example, the system may transmit an audio file through the user device (e.g., the customer's smart speaker) that says: "We cannot complete the card activation at this time. Would you like to complete the process through this phone number: 804-123-4567?"

In block 126, the comparison system 220 may activate the card based on the determination that the voice request is valid. For example, the system may enable the card such that the customer may begin to use the card for conducting transactions.

Figure 2:
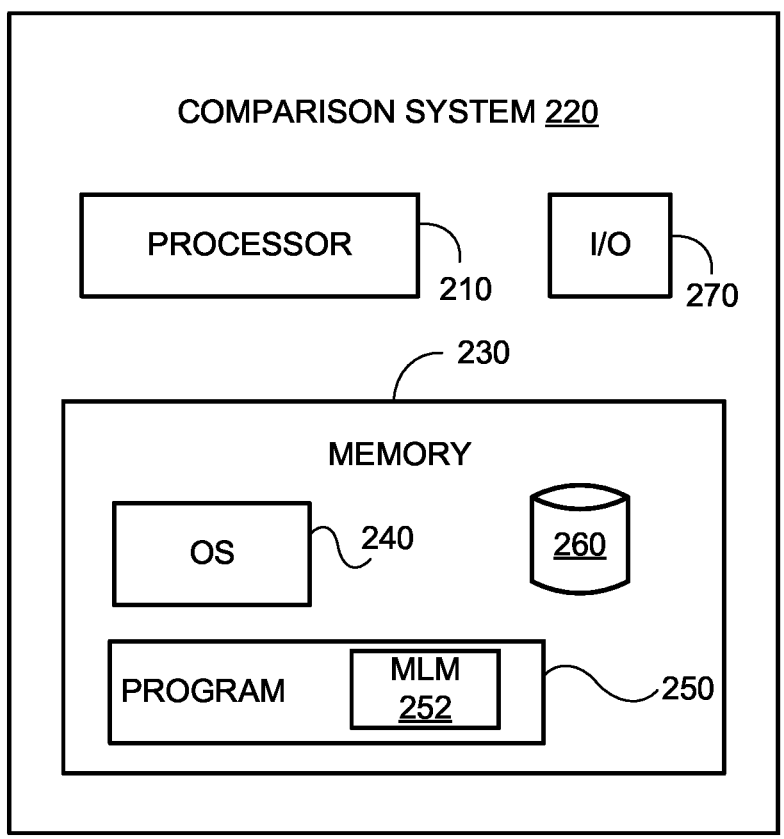
FIG. 2 is a block diagram of an example comparison system used to conduct card authentication, according to an example implementation of the disclosed technology.
Figure 3:
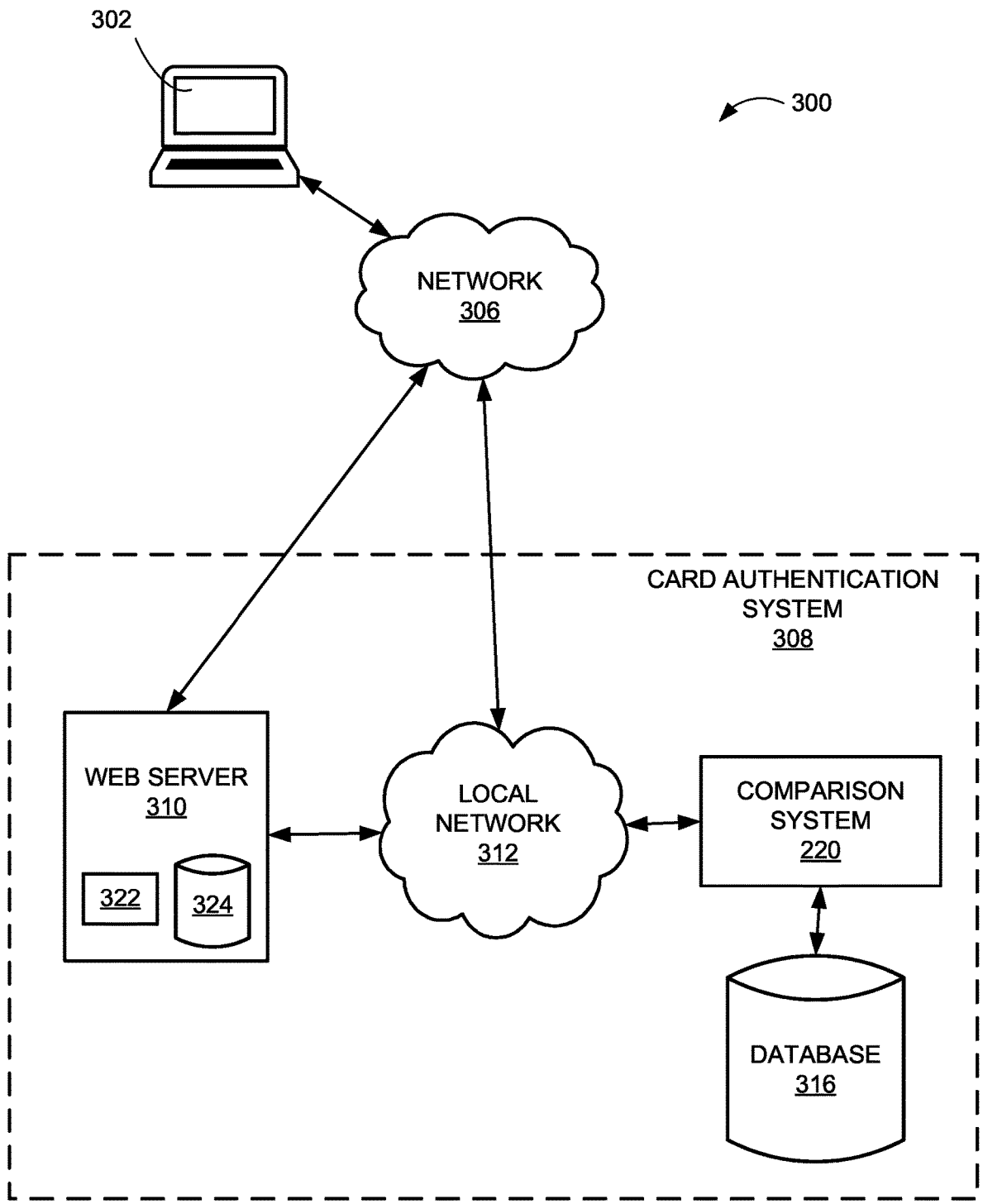
FIG. 3 is a block diagram of an example system that may be used to conduct card authentication, according to an example implementation of the disclosed technology.

FIG. 2 is a block diagram of an example comparison system 220 used to conduct card authentication, according to an example implementation of the disclosed technology. According to some embodiments, the user device 302, and web server 310, as depicted in FIG. 3 and described below, may have a similar structure and components that are similar to those described with respect to comparison system 220 shown in FIG. 2. As shown, the comparison system 220 may include a processor 210, an input/output (I/O) device 270, a memory 230 containing an operating system (OS) 240 and a program 250. In some embodiments, program 250 may include an MLM 252 that may be trained, for example, to generate a voice fingerprint confidence score, a device authentication score, and/or a card number score to aid in card authentication. In certain implementations, MLM 252 may issue commands in response to processing an event, in accordance with a model that may be continuously or intermittently updated. Moreover, processor 210 may execute one or more programs (such as via a rules-based platform or the trained MLM 252), that, when executed, perform functions related to disclosed embodiments.

In certain example implementations, the comparison system 220 may be a single server or may be configured as a distributed computer system including multiple servers or computers that interoperate to perform one or more of the processes and functionalities associated with the disclosed embodiments. In some embodiments comparison system 220 may be one or more servers from a serverless or scaling server system. In some embodiments, the comparison system 220 may further include a peripheral interface, a transceiver, a mobile network interface in communication with the processor 210, a bus configured to facilitate communication between the various components of the comparison system 220, and a power source configured to power one or more components of the comparison system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the comparison system 220 may include one or more storage devices configured to store information used by the processor 210 (or other components) to perform certain functions related to the disclosed embodiments. In one example, the comparison system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The comparison system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the comparison system 220 may include the memory 230 that may include one or more programs 250 to perform one or more functions of the disclosed embodiments. For example, in some embodiments, the comparison system 220 may additionally manage dialogue and/or other interactions with the customer via a program 250.

The processor 210 may execute one or more programs 250 located remotely from the comparison system 220. For example, the comparison system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the comparison system 220 to perform one or more of the processes and functionalities associated with the disclosed embodiments.

The database 260 may include stored data relating to status data (e.g., average session duration data, location data, idle time between sessions, and/or average idle time between sessions) and historical status data. According to some embodiments, the functions provided by the database 260 may also be provided by a database that is external to the comparison system 220, such as the database 316 as shown in FIG. 3.

The comparison system 220 may also be communicatively connected to one or more memory devices (e.g., databases) locally or through a network. The remote memory devices may be configured to store information and may be accessed and/or managed by the comparison system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The comparison system 220 may also include one or more I/O devices 270 that may comprise one or more interfaces for receiving signals or input from devices and providing signals or output to one or more devices that allow data to be received and/or transmitted by the comparison system 220. For example, the comparison system 220 may include interface components, which may provide interfaces to one or more input devices, such as one or more keyboards, mouse devices, touch screens, track pads, trackballs, scroll wheels, digital cameras, microphones, sensors, and the like, that enable the comparison system 220 to receive data from a user (such as, for example, via the user device 302).

In examples of the disclosed technology, the comparison system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The comparison system 220 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The comparison system 220 may be configured to adjust model parameters during training. Model parameters may include weights, coefficients, offsets, or the like. Training may be supervised or unsupervised.

The comparison system 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hillclimb, a neighborhood search, an adaptive random search, or the like. The comparison system 220 may be configured to optimize statistical models using known optimization techniques.

Furthermore, the comparison system 220 may include programs configured to retrieve, store, and/or analyze properties of data models and datasets. For example, comparison system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The comparison system 220 may include algorithms to determine a data type, key-value pairs, row-column data structure, statistical distributions of information such as keys or values, or other property of a data schema may be configured to return a statistical profile of a dataset (e.g., using a data-profiling model). The comparison system 220 may be configured to implement univariate and multivariate statistical methods. The comparison system 220 may include a regression model, a Bayesian model, a statistical model, a linear discriminant analysis model, or other classification model configured to determine one or more descriptive metrics of a dataset. For example, comparison system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The comparison system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, comparison system 220 may be configured to generate a similarity metric representing a measure of similarity between data in a dataset. A similarity metric may be based on a correlation, covariance matrix, a variance, a frequency of overlapping values, or other measure of statistical similarity.

The comparison system 220 may be configured to generate a similarity metric based on data model output, including data model output representing a property of the data model. For example, comparison system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The comparison system 220 may be configured to classify a dataset. Classifying a dataset may include determining whether a dataset is related to another dataset. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The comparison system 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, comparison system 220 is configured to generate and/or train a classification model to classify a dataset, consistent with disclosed embodiments.

The comparison system 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the asset detection system may analyze information applying machine-learning methods.

While the comparison system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the comparison system 220 may include a greater or lesser number of components than those illustrated.

FIG. 3 is a block diagram of an example system that may be used to view and interact with card authentication system 308, according to an example implementation of the disclosed technology. The components and arrangements shown in FIG. 3 are not intended to limit the disclosed embodiments as the components used to implement the disclosed processes and features may vary. As shown, card authentication system 308 may interact with a user device 302 via a network 306. In certain example implementations, the card authentication system 308 may include a local network 312, a comparison system 220, a web server 310, and a database 316.

In some embodiments, a respective user may operate the user device 302. The user device 302 can include one or more of a mobile device, smart phone, smart device (e.g., smart speaker), general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the card authentication system 308. In some embodiments, the user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the card authentication system 308. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The comparison system 220 may include programs (scripts, functions, algorithms) to configure data for visualizations and provide visualizations of datasets and data models on the user device 302. This may include programs to generate graphs and display graphs. The comparison system 220 may include programs to generate histograms, scatter plots, time series, or the like on the user device 302. The comparison system 220 may also be configured to display properties of data models and data model training results including, for example, architecture, loss functions, cross entropy, activation function values, embedding layer structure and/or outputs, convolution results, node outputs, or the like on the user device 302.

The network 306 may be of any suitable type, including individual connections via the internet such as cellular or WiFi networks. In some embodiments, the network 306 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The card authentication system 308 may be associated with and optionally controlled by one or more entities such as a business, corporation, individual, partnership, or any other entity that provides one or more of goods, services, and consultations to individuals such as customers. In some embodiments, the card authentication system 308 may be controlled by a third party on behalf of another business, corporation, individual, partnership. The card authentication system 308 may include one or more servers and computer systems for performing one or more functions associated with products and/or services that the organization provides.

Web server 310 may include a computer system configured to generate and provide one or more websites accessible to customers, as well as any other individuals involved in accessing card authentication system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that are authenticated by the comparison system 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the account consolidation system 408 to interact with one another and to connect to the network 306 for interacting with components in the system 300 environment. In some embodiments, the local network 312 may include an interface for communicating with or linking to the network 306. In other embodiments, certain components of the card authentication system 308 may communicate via the network 306, without a separate local network 306.

The card authentication system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access card authentication system 308 using the cloud computing environment. User device 302 may be able to access card authentication system 308 using specialized software. The cloud computing environment may eliminate the need to install specialized software on user device 302.

In accordance with certain example implementations of the disclosed technology, the card authentication system 308 may include one or more computer systems configured to compile data from a plurality of sources, such as the comparison system 220, web server 310, and/or the database 316. The comparison system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

EXAMPLE USE CASE

The following example use case describes examples of a typical user flow pattern. This section is intended solely for explanatory purposes and not in limitation.

In one example, a customer of a financial institution may receive a new payment card in the mail that requires activation before the customer can begin using the payment card. The customer may own a smart speaker, and may have previously registered the smart speaker with the financial institution by inputting device identification information, such as an IP address, into the customer's account profile. To begin a card activation process, the customer may speak the following into the smart speaker: "I'd like to activate my new card ending in 1234." A backend server associated with the financial institution may receive this voice request, and may use a first MLM to generate a voice fingerprint confidence score based on the customer's voice. The first MLM may be trained to evaluate various features (e.g., pitch, pace, articulation, etc.) of the customer's voice and compare them to respective features of a voice sample the customer previously recorded and submitted to the system for storage and association with the customer's account. The system may also use a second MLM to generate a device authentication score associated with the customer's smart speaker. The second MLM may be trained to identify an IP address of the smart speaker, and compare it to the IP address the customer previously had stored and associated with the customer's account. Additionally, having received the last four digits of the new card number in the customer's voice request, the system may also retrieve, for example, from an account associated with the customer, the number of the card that was most recently assigned to and mailed out to the customer, such that the system can compare numbers. Based on these three factors—the voice fingerprint confidence score, the device authentication score, and the card number comparison—the system may determine whether the customer's voice request is valid. The system may be configured to weigh and balance the three factors in a predetermined fashion. For example, the system may first evaluate the card number comparison to ensure the last four digits from the voice request match the last four digits of the card that was mailed to the customer. Responsive to finding a match, the system may evaluate the device authentication score to ensure either an exact match, or at least that the stored IP address and the IP address retrieved by the system in real-time, are both associated with the same network. Finally, the system may then evaluate the voice fingerprint confidence score to ensure it at least exceeds a specific threshold. Based on the above, the system may activate the customer's new payment card.

Clause 1: A card authentication system comprising: one or more processors; and memory in communication with the one or more processors and storing instructions that, when executed by the one or more processors, are configured to cause the card authentication system to: receive, via a user device, an audio file comprising a first voice of a customer; associate the audio file with a first customer account of the customer; store the audio file; receive, via the user device, a first credential token and a voice request to activate a card associated with a second customer account; generate, using a first machine learning model, a voice fingerprint confidence score based on comparing a second voice in the voice request to the first voice of the stored audio file; generate, using a second machine learning model, a device authentication score based on comparing an address from the user device to a stored address of a known user device associated with the second customer account; determine whether the first credential token is valid by comparing the first credential token to a second credential token associated with the user device; determine whether the voice request is valid based at least in part on the voice fingerprint confidence score, the device authentication score, and the determination of whether the first credential token is valid; and activate the card based on the determination that the voice request is valid.

Clause 2: The system of clause 1, wherein the instructions are further configured to cause the card authentication system to: receive a request for the second credential token associated with the user device; generate the second credential token; and store the second credential token.

Clause 3: The system of clause 1, wherein the voice request comprises a card number associated with the card, and wherein the instructions are further configured to cause the card authentication system to: generate, using a third machine learning model, a card number score by comparing the card number to a second card number previously associated with the customer.

Clause 4: The system of clause 3, wherein determining whether the voice request is valid is further based on the card number score.

Clause 5: The system of clause 1, wherein the instructions are further configured to cause the card authentication system to: transmit, via the user device, a second audio file based on the determination that the voice request is not valid.

Clause 6: The system of clause 5, wherein the second audio file comprises a request that the customer submit a new voice request.

Clause 7: The system of clause 5, wherein the second audio file comprises a request that the customer be contacted via a stored phone number to complete activation of the card.

Clause 8: The system of clause 1, wherein generating the device authentication score is further based on determining whether a location of the user device is within a predetermined distance of a known location of a second customer associated with the second customer account.

Clause 9: The system of clause 1, wherein comparing the second voice in the voice request to the first voice of the stored audio file comprises comparing one or more respective voice features, the one or more respective voice features comprising one or more of pitch, tone, cadence, rate, volume, pace, pause, fluency, intensity, articulation, enunciation, or combinations thereof.

Clause 10: The system of clause 1, wherein the instructions are further configured to cause the card authentication system to: receive image data via the user device; extract an image of a speaker of the voice request from the image data; and determine whether the image of the speaker matches a stored image of a second customer associated with the second customer account.

Clause 11: A card authentication system comprising: one or more processors; and memory in communication with the one or more processors and storing instructions that, when executed by the one or more processors, are configured to cause the card authentication system to: receive, via a user device, a voice request to activate a card associated with a customer account; generate, using a first machine learning model, a voice fingerprint confidence score based on comparing a first voice in the voice request to a second voice in a stored audio file associated with a customer of the customer account; generate, using a second machine learning model, a device authentication score based on comparing an address from the user device to a stored address of a known user device associated with the customer account; determine whether the voice request is valid based at least in part on the voice fingerprint confidence score and the device authentication score; and activate the card based on the determination that the voice request is valid.

Clause 12: The system of clause 11, wherein the instructions are further configured to cause the card authentication system to: receive the audio file via the user device; associate the audio file with the customer account; and store the audio file.

Clause 13: The system of clause 11, wherein the voice request comprises a card number associated with the card, and wherein the instructions are further configured to cause the card authentication system to: generate, using a third machine learning model, a card number score by comparing the card number to a second card number previously associated with the customer.

Clause 14: The system of clause 13, wherein determining whether the voice request is valid is further based on the card number score.

Clause 15: The system of clause 11, wherein the instructions are further configured to cause the card authentication system to: transmit, via the user device, a second audio file based on the determination that the voice request is not valid, wherein the second audio file comprises a request that the customer be contacted via a stored phone number to complete activation of the card.

Clause 16: The system of clause 11, wherein generating the device authentication score is further based on determining whether a location of the user device is within a predetermined distance of a known location of a second customer associated with the customer account.

Clause 17: The system of clause 11, wherein comparing the first voice in the voice request to a second voice in a stored audio file comprises comparing one or more respective voice features, the one or more respective voice features comprising one or more of pitch, tone, cadence, rate, volume, pace, pause, fluency, intensity, articulation, enunciation, or combinations thereof.

Clause 18: A card authentication system comprising: one or more processors; and memory in communication with the one or more processors and storing instructions that, when executed by the one or more processors, are configured to cause the card authentication system to: receive a request for a first credential token associated with a user device; generate the first credential token; store the first credential token; receive, via the user device, a second credential token and a voice request to activate a card associated with a customer account; generate, using a first machine learning model, a voice fingerprint confidence score based on comparing a voice in the voice request to a stored voice associated with the customer account; determine whether the second credential token is valid by comparing the first credential token to the second credential token; determine whether the voice request is valid based at least in part on the voice fingerprint confidence score and the determination of whether the second credential token is valid; and activate the card based on the determination that the voice request is valid.

Clause 19: The system of clause 18, wherein the instructions are further configured to cause the card authentication system to: transmit, via the user device, an audio file based on the determination that the voice request is not valid, wherein the audio file comprises a request that a customer associated with the customer account be contacted via a stored phone number to complete activation of the card.

Clause 20: The system of clause 18, wherein the voice request comprises a card number associated with the card, and wherein the instructions are further configured to cause the card authentication system to: generate, using a second machine learning model, a card number score by comparing the card number to a second card number previously associated with a customer of the customer account.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A card authentication system comprising:
   one or more processors; and
   memory in communication with the one or more processors and storing instructions that, when executed by the one or more processors, are configured to cause the card authentication system to:
   receive, via a user device, an audio file comprising a first voice of a customer;
   associate the audio file with a first customer account of the customer;
   store the audio file;
   receive, via the user device, a first credential token and a voice request to activate a card associated with a second customer account, wherein the voice request comprises a first number associated with the card;
   generate, using a first machine learning model, a voice fingerprint confidence score based on comparing a second voice in the voice request to the first voice of the stored audio file;
   generate, using a second machine learning model, a device authentication score based on (i) comparing an address from the user device to a stored address of a known user device associated with the second customer account and (ii) determining whether the user device and the known user device are connected to a shared communication network;

determine whether the first credential token is valid by comparing the first credential token to a second credential token associated with the user device;
determine whether the voice request is valid based at least in part on the determination of whether the first credential token is valid and by:
 determining whether the first number matches a stored second number associated with the card;
 responsive to determining the first number matches the stored second number, determining whether the device authentication score exceeds a first predetermined threshold; and
 responsive to determining the device authentication score exceeds the first predetermined threshold, determining whether the voice fingerprint confidence score satisfies a second predetermined threshold; and
activate the card based on the determination that the voice request is valid.

2. The system of claim 1, wherein the instructions are further configured to cause the card authentication system to:
receive a request for the second credential token associated with the user device;
generate the second credential token; and
store the second credential token.

3. The system of claim 1, wherein determining whether the first number matches the stored second number is conducted using a third machine learning model.

4. The system of claim 1, wherein the instructions are further configured to cause the card authentication system to:
transmit, via the user device, a second audio file based on the determination that the voice request is not valid.

5. The system of claim 4, wherein the second audio file comprises a request that the customer submit a new voice request.

6. The system of claim 4, wherein the second audio file comprises a request that the customer be contacted via a stored phone number to complete activation of the card.

7. The system of claim 1, wherein generating the device authentication score is further based on determining whether a location of the user device is within a predetermined distance of a known location of a second customer associated with the second customer account.

8. The system of claim 1, wherein comparing the second voice in the voice request to the first voice of the stored audio file comprises comparing one or more respective voice features, the one or more respective voice features comprising one or more of pitch, tone, cadence, rate, volume, pace, pause, fluency, intensity, articulation, enunciation, or combinations thereof.

9. The system of claim 1, wherein the instructions are further configured to cause the card authentication system to:
receive image data via the user device;
extract an image of a speaker of the voice request from the image data; and
determine whether the image of the speaker matches a stored image of a user associated with the second customer account.

10. A card authentication system comprising:
one or more processors; and
memory in communication with the one or more processors and storing instructions that, when executed by the one or more processors, are configured to cause the card authentication system to:
 receive, via a user device, a voice request to activate a card associated with a customer account, wherein the voice request comprises a first number associated with the card;
 generate, using a first machine learning model, a voice fingerprint confidence score based on comparing a first voice in the voice request to a second voice in a stored audio file associated with a customer of the customer account;
 generate, using a second machine learning model, a device authentication score based on (i) comparing an address from the user device to a stored address of a known user device associated with the customer account and (ii) determining whether the user device and the known user device are connected to a shared communication network;
 determine whether the voice request is valid by:
  determining whether the first number matches a stored second number associated with the card;
  responsive to determining the first number matches the stored second number, determining whether the device authentication score exceeds a first predetermined threshold; and
  responsive to determining the device authentication score exceeds the first predetermined threshold, determining whether the voice fingerprint confidence score satisfies a second predetermined threshold; and
 activate the card based on the determination that the voice request is valid.

11. The system of claim 10, wherein the instructions are further configured to cause the card authentication system to:
receive the audio file via the user device;
associate the audio file with the customer account; and
store the audio file.

12. The system of claim 10, wherein determining whether the first number matches the stored second number is conducted using a third machine learning model.

13. The system of claim 10, wherein the instructions are further configured to cause the card authentication system to:
transmit, via the user device, a second audio file based on the determination that the voice request is not valid, wherein the second audio file comprises a request that the customer be contacted via a stored phone number to complete activation of the card.

14. The system of claim 10, wherein generating the device authentication score is further based on determining whether a location of the user device is within a predetermined distance of a known location of a second customer associated with the customer account.

15. The system of claim 10, wherein comparing the first voice in the voice request to a second voice in a stored audio file comprises comparing one or more respective voice features, the one or more respective voice features comprising one or more of pitch, tone, cadence, rate, volume, pace, pause, fluency, intensity, articulation, enunciation, or combinations thereof.

16. A card authentication system comprising:
one or more processors; and
memory in communication with the one or more processors and storing instructions that, when executed by the one or more processors, are configured to cause the card authentication system to:
 receive a request for a first credential token associated with a user device;
 generate the first credential token;

store the first credential token;

receive, via the user device, a second credential token and a voice request to activate a card associated with a customer account, wherein the voice request comprises a first number associated with the card;

generate, using a first machine learning model, a voice fingerprint confidence score based on comparing a voice in the voice request to a stored voice associated with the customer account;

determine whether the second credential token is valid by comparing the first credential token to the second credential token;

determine whether the voice request is valid based at least in part on the determination of whether the second credential token is valid and by:

determining whether the user device and a known user device are connected to a shared communication network;

determining whether the first number matches a stored second number associated with the card; and responsive to determining the first number matches the stored second number, determining whether the voice fingerprint confidence score satisfies a second predetermined threshold; and activate the card based on the determination that the voice request is valid.

17. The system of claim 16, wherein the instructions are further configured to cause the card authentication system to:

transmit, via the user device, an audio file based on the determination that the voice request is not valid, wherein the audio file comprises a request that a customer associated with the customer account be contacted via a stored phone number to complete activation of the card.

18. The system of claim 16, wherein determining whether the first number matches the stored second number is conducted using a second machine learning model.

19. The system of claim 1, wherein the user device comprises a smart speaker.

* * * * *